United States Patent Office 3,546,285
Patented Dec. 8, 1970

3,546,285
PROCESS OF PURIFYING AROMATIC DICARBOXYLIC ACIDS
Enrique R. Witt, Corpus Christi, Tex., assignor to Celanese Corporation, New York, N.Y., a corporation of Delaware
No Drawing. Filed June 20, 1967, Ser. No. 647,347
Int. Cl. C07c *51/42*
U.S. Cl. 260—525                                14 Claims

ABSTRACT OF THE DISCLOSURE

A process for purifying aromatic dicarboxylic acids, and particularly terephthalic acid, to provide, in a single stage, a fiber grade acid, which process involves catalytically hydrogenating the acid to be purified at an elevated temperature, e.g., above about 250° C., in a solvent which is, at least in major part, an aliphatic saturated fatty acid, e.g., acetic acid, and cooling the hydrogenated solution to crystallize the purified acid, leaving hydrogenated impurities in solution.

---

This invention relates to a novel method of purifying previously prepared aromatic dicarboxylic acids, and especially terephthalic acid. More particularly, this invention relates to a novel method of purifying terephthalic acid which provides, in a single stage, fiber grade terephthalic acid.

The increasing commercial importance of high molecular weight polyesters in fibers, such as "Fortrel" polyester fiber, and films, such as "Celanar" polyester film, has led to a steadily growing demand in recent years for terephthalic acid and various derivatives thereof. These high molecular weight polyesters are generally prepared either by first transesterifying a dialkyl terephthalate, such as dimethylterephthalate, with a glycol and then polymerizing the resulting bis(hydroxyalkyl) terephthalate, or by first reacting terephthalic acid itself with an alkylene oxide to give the polymerizable bis(hydroxyalkyl) terephthalate. In either case, the indirect route to the desired high molecular weight polyester, proceeding through a terephthalic acid derivative rather than the acid itself to the glycol terephthalate, is more complicated and therefore more costly.

However, such roundabout routes have heretofore been considered necessary for at least the following reasons. Terephthalic acid as normally produced by the air oxidation of p-xylene, or for that matter terephthalic acid from any known source, is relatively impure, containing such partial oxidation products as toluic acid and 4-carboxybenzaldehyde in significant amounts. While toluic acid is not a particularly harmful impurity, in that it is readily removed by cooling and crystallizing terephthalic acid solutions containing it, others of these impurities and particularly 4-carboxybenzaldehyde, are difficult to remove from terephthalic acid itself, but can more readily be separated from the above-mentioned terephthalic acid derivatives. And since polyester which is not only of high purity but also relatively uniform in the nature and amounts of its impurities from batch to batch is absolutely necessary for fiber and film production, the art has in effect been forced to operate using the above-described indirect routes, despite the theoretical attractiveness of direct esterification of terephthalic acid with the desired glycol.

British Pat. No. 994,769 to the Standard Oil Company, which is incorporated herein by reference, proposes that terephthalic acid be purified by first dissolving it in water and then catalytically hydrogenating the resulting solution at elevated temperatures and pressures. Such treatment chiefly serves to reduce 4-carboxybenzaldehyde to p-methylolbenzoic acid and toluic acid, the latter, hydrogenated impurities being readily removable by cooling and crystallization. However, other potential color-forming compounds besides 4-carboxybenzaldehyde, i.e., ones having reducible functional groups other than carboxyl groups attached to an aromatic ring, will also be reduced. Thus, for example, benzophenone and fluorenone dicarboxylic acids, which have been reported as impurities in terephthalic acid produced by air oxidation of p-xylene, will also have their carbonyl groups reduced by this treatment.

The present invention provides a novel process for purifying terephthalic acid which represents a marked improvement over the above-described purification process. More particularly, it has now been discovered, quite unexpectedly, that if the patented process is modified by using an aliphatic saturated fatty acid which is a liquid at the temperature at which the reaction is carried out, e.g., acetic acid, as at least part of the reaction solvent, terephthalic acid of appreciably greater purity than that obtainable using the patented process can be recovered after only one crystallization.

It is, therefore, an object of the present invention to provide a novel method of purifying previously prepared aromatic dicarboxylic acids, and especially terephthalic acid.

It is also an object of the present invention to provide a novel method of purifying terephthalic acid which provides, in a single stage, fiber grade terephthalic acid.

These and other objects of the present invention will be discussed in greater detail hereinbelow.

Terephthalic acid will be mentioned throughout the instant specification to exemplify aromatic dicarboxylic acids in general, it being understood that any aromatic dicarboxylic acids besides terephthalic acid, and particularly isophthalic, 4,4′-diphenyldicarboxylic, and the like, as well as mixtures thereof, can be purified by the novel method of the present invention.

As just indicated, the novel process of the present invention is carried out using an aliphatic saturated fatty acid, either monocarboxylic or polycarboxylic, as at least part of the solvent in the impure terephthalic acid solution being hydrogenated. This includes both lower aliphatic saturated fatty acids which are liquids at room temperature (about 25° C.), and particularly saturated fatty monocarboxylic acids having from 2 to 5 carbon atoms, inclusive, such as acetic acid, propionic acid, butyric acid, isobutyric acid, n-valeric acid, and the like, and higher aliphatic saturated fatty acids which, although solids at room temperature, are liquids at the temperature at which the hydrogenation reaction is carried out, such as lauric acid, tridecylic acid, myristic acid, pentadecylic acid, palmitic acid, margaric acid, stearic acid, succinic acid, glutaric acid, adipic acid, and the like.

All of the solvent present can be one or a mixture of the aforementioned aliphatic saturated fatty acids. Alternatively, up to about 30%, and preferably from about 2% to about 20% by volume, based on the total volume of the solvent, of the acid can be replaced by water. A particularly preferred solvent system is acetic acid/water in ratios of from about 95%:5% to about 80%:20%, respectively, by volume.

Benzoic acid and similar monocyclic aromatic monocarboxylic acids, preferably those having less than 10 carbon atoms, although not coming within the expression "aliphatic saturated fatty acids," can also be employed as all or part of the solvent in the novel process of the present invention. Such aromatic acids can be used in addition to, or instead of, the aforementioned aliphatic acids, and will be used in equivalent amounts under the same operating conditions.

The acid or acids employed as at least part of the solvent in the novel process of the present invention will preferably be free of functional groups other than carboxyl groups, and especially functional groups which are reducible under the conditions of this process.

The total amount of solvent employed will generally be that amount required to dissolve terephthalic acid and the impurities associated therewith at the temperature at which the hydrogenation reaction is carried out. Normally, this amount of solvent will be such that the concentration of dissolved terephthalic acid therein will range from about 5% to about 30%, and preferably from about 10% to about 20% by weight, based on the total weight of the solution.

The hydrogenation reaction is carried out at an elevated temperature (generally above about 250° C.), which will ordinarily be as low as is practical consistent with the need to obtain a commercially feasible concentration of terephthalic acid, i.e., at least about 5% by weight, in the solution being hydrogenated. Usually, temperatures ranging from about 250° C. to about 350° C., and preferably from about 280° C. to about 320° C., will be employed, although some or all of such factors as the total pressure at which the reaction is carried out, the partial pressure of hydrogen in the system, whether the reaction is carried out as a batch or a continuous reaction (and in the case of the latter, what kind of continuous reaction is involved), the amount and kind of impurities present, the degree of reduction required to give terephthalic acid of a given purity, etc., can dictate operation at temperatures above or below the extremes of the above-stated broad range.

Similarly, the total pressure at which the hydrogenation reaction is carried out, as well as the partial pressure of hydrogen in the system, can vary to a considerable extent depending on such variables as temperature and the factors other than pressure mentioned above. In general, however, the total pressure of the system in a batch reaction will range from about 100 to about 3000 p.s.i.g., and preferably from about 500 to about 1500 p.s.i.g., while for the various commonly employed continuous processes, e.g., ones involving percolating the terephthalic acid solution downward through a fixed catalyst bed in contact with a previously or intermittently introduced hydrogen atmosphere, or countercurrently contacting hydrogen and the terephthalic acid solution in the presence of either a fixed catalyst bed or slurried catalyst, the total pressure of the system will range from about 100 to about 2000 p.s.i.g., and preferably from about 300 to about 1500 p.s.i.g.

In every case, the differences between the total pressure ranges given above for batch and continuous reactions are attributable to the different hydrogen partial pressures required in these various reaction methods. In most if not all cases, the partial pressure of hydrogen in a batch reaction will range from about 50 to about 500 p.s.i.g., and preferably from about 100 to about 300 p.s.i.g., while for a continuous process the partial hydrogen pressure can range from as low as about 5 p.s.i.g. to as much as about 200 p.s.i.g.

In addition to hydrogen and water vapor, part of the gaseous component in the reaction sphere can be an inert gas, such as nitrogen, argon, or the like.

The catalyst used can be any of those customarily employed in liquid phase hydrogenation reactions, with supported noble metals, such as platinum, palladium or iridium on charcoal, alumina, or the like (a charcoal support being preferred due to its resistance to acid attack and also because it facilitates the recovery of metal from spent catalyst), and other Group VIII metal catalysts, e.g., Raney nickel, being especially preferred. The amount of catalyst used is not critical, and can vary within wide limits depending on the nature and amount of the impurities in the terephthalic acid solution, the type of catalyst itself, the extent of purification desired and the reaction conditions employed, etc. Thus, for example, typical hydrogenation catalysts, such as palladium on charcoal wherein palladium comprises from about 0.1% to about 1% of the total weight of the catalyst, can be used in batch processes in amounts ranging from about 0.1% to about 10% by weight, and preferably from about 0.5% to about 5% by weight, based on the total weight of the charge. The same types and amounts of catalysts will also give acceptable service in continuous processes.

The time required to carry out the hydrogenation reaction (contact time) will vary depending, again, on such factors as temperature, pressure, the amounts and types of impurities present, etc., but in general will range from about 60 seconds to about 2 hours, and preferably from about 5 minutes to about 1 hour.

It should be apparent from the foregoing description of the present invention that, with the exception of the amount and type of solvent used, the other variables incident to the hydrogenation reaction, e.g., temperatures, pressures, reaction times, types and amounts of catalysts, etc., are not critical, and merely represent the best mode of carrying out the invention known at the present time. Accordingly, variations within the ranges and types given above, as well as departures therefrom, are well within the scope of the present invention.

The purified terephthalic acid can be separated from the hydrogenated solution by simply cooling the solution down to the atmospheric boiling point of the solvent or solvent mixture employed, or below, provided that the solution is not cooled to the point at which the solvent will solidify, and preferably to ambient temperature, i.e., from about 25° C. to about 30° C. when using such solvents as acetic acid or acetic acid-water mixtures, which permits the terephthalic acid to crystallize from solution, leaving the hydrogenated impurities, principally p-toluic acid, in solution. Thus, for example, a hydrogenated solution of terephthalic acid in a 95:5% by volume mixture of acetic acid and water, respectively, need merely be cooled below about 110° C. to effect crystallization of purified terephthalic acid.

When an analytical sample is desired, the procedure employed in certain of the working examples given herein can be followed. Thus, instead of merely filtering to remove the mother liquor from the cooled mixture of terephthalic acid, hydrogenation catalyst and mother liquor and then screening to separate the catalyst, the filter cake is first dissolved in aqueous ammonium hydroxide to form the ammonium salt of terephthalic acid, then filtered to remove the catalyst, and finally acidified to spring terephthalic acid from its ammonium salt.

An added advantage obtained when using the novel process of the present invention is that in those cases where the impure terephthalic acid free is obtained by the air oxidation of p-xylene, residues of the catalyst used in the oxidation reaction, e.g., cobalt naphthenate residues, which are carried over with the terephthalic acid feed remain in the crystallization liquor after hydrogenation and cooling to remove purified terephthalic acid, and can be recycled to the oxidation reaction, thus affording not only a purer terephthalic acid but also a saving in catalyst cost.

In addition, as illustrated by Example XVI hereinbelow, terephthalic acid produced by nitric acid oxidation, which has up to now been considered practically impossible to purify economically (except by going through dimethylterephthalate), can now be purified by the novel process of the present invention to not only reduce 4-carboxybenzaldehyde to fiber grade specifications, but also to reduce the nitrogen content to practically nil.

In order that those skilled in the art can more fully understand the present invention, the following examples are set forth. These examples are given solely for the purpose of illustrating the invention, and should not be considered as expressing limitations unless so set forth in the appended claims. All parts and percentages are by weight, unless otherwise stated.

EXAMPLES I–XIX

In each of these examples, with the exceptions noted hereinbelow, impure terephthalic acid, obtained by the air oxidation of p-xylene in the presence of a cobalt catalyst, was first dissoved in the amount of solvent or solvent mixture, i.e., acetic acid alone (Example VII), water alone (comparative Examples XVII, XVIII and XIX), or acetic acid in admixture with water, indicated in Table I hereinbelow. To this solution there was then added the indicated amount of hydrogenation catalyst, and the resulting catalyzed solution was introduced into a pressure vessel together with sufficient hydrogen to give a hydrogen pressure of 200 p.s.i.g. Hydrogenation was then carried out by heating to a peak temperature of 300° C. and then maintaining the reaction mixture at that temperature for 1 hour.

Upon completion of the hydrogenation reaction, the pressure vessel was allowed to cool to room temperature (about 25° C.) and then opened.

In order to obtain analytical samples, the mixture of terephthalic acid, hydrogenation catalyst and mother liquor (containing hydrogenated impurities, principally toluic acid) was filtered to remove the mother liquor, after which the filter cake was dissolved in aqueous 28% ammonium hydroxide, with stirring (the stirring being continued until an essentially homogeneous solution containing undissolved catalyst particles was obtained), then filtered again to remove the catalyst. The filtrate was then acidified to a pH of about 6 with concentrated sulfuric acid to spring free terephthalic acid from its ammonium salt.

The following exceptions to the above-described process were practiced:

In Example XVI, the crude terephthalic acid feed was obtained by nitric acid oxidation of p-xylene.

In Examples IV and XIX, no hydrogenation catalyst was added. In the case of Example IV, this was done to see if the cobalt catalyst from the oxidation process would also serve as a hydrogenation catalyst. In addition, the terephthalic acid obtained from these runs, and also from Example V, was, in each case, simply screened off and analyzed directly, without conversion to the ammonium salt and springing.

In Examples V and XIX, no hydrogen was introduced, even though the crude terephthalic acid in water or acetic acid-water solvent was heated as described hereinabove. Thus, those examples illustrate regular crystallizations for purposes of comparison.

In Examples VIII and XII, the reaction mixture was maintained at peak temperature for 20 minutes, rather than 1 hour.

In Examples X, XV and XVIII, the contents of the pressure vessel were filtered hot, i.e. at 90° C. (Example X) or 100° (Examples XV and XVIII), rather than at room temperature.

TABLE I

| Example | I | II | III | IV | V | VI | VII |
|---|---|---|---|---|---|---|---|
| Crude TPA [1]: | | | | | | | |
| Percent CBA [2] | 1.93 | 1.93 | 0.72 | 0.71 | 0.71 | 0.71 | 0.71 |
| Percent TA [3] | 2.12 | 2.12 | 0.81 | 0.82 | 0.82 | 0.82 | 0.82 |
| Co, p.p.m.[4] | | | | 860 | 860 | 860 | 860 | 860 |
| Solvent: | | | | | | | |
| Percent AcOH [5] | 80 | 80 | 80 | 80 | 80 | 80 | 100 |
| Percent H$_2$O | 20 | 20 | 20 | 20 | 20 | 20 | |
| Percent TPA concentration in solution | 5 | 5 | 5 | 5 | 5 | 20 | 10 |
| Catalyst, percent | 1 | 1 | 1 | | | 1 | 1 |
| (Wt. percent of solution) | (0.1% Pd/C) [6] | (0.1% Pd/Al) [7] | (0.1% Pd/C) | | | (0.1% Pd/C) | (0.1% Pd/C) |
| Purified TPA: | | | | | | | |
| CBA, p.p.m | 10 | 18 | 30 | 1,600 | 1,400 | 20 | 25 |
| TA, p.p.m | 230 | 360 | 50 | 50 | 50 | 55 | 50 |
| Co, p.p.m | | | <10 | <10 | <10 | >10 | <10 |

| Example | VIII | IX | X | XI | XII | XIII |
|---|---|---|---|---|---|---|
| Crude TPA [1]: | | | | | | |
| Percent CBA [2] | 0.71 | 0.71 | 0.71 | 0.71 | 0.71 | 0.71 |
| Percent TA [3] | 0.82 | 0.82 | 0.82 | 0.82 | 0.82 | 0.82 |
| Co, p.p.m.[4] | 860 | | | 860 | | |
| Solvent: | | | | | | |
| Percent AcOH [5] | 80 | 95 | 80 | 95 | 95 | 95 |
| Percent H$_2$O | 20 | 5 | 20 | 5 | 5 | 5 |
| Percent TPA concentration in solution | 10 | 20 | 20 | 20 | 20 | 15 |
| Catalyst, percent | 1 | 1 | 1 | 1 | 1 | 1 |
| (Wt. percent of solution) | (0.1% Pd/C) | (0.1% Pd/C) | (0.1% Pd/C) | (0.1% Pd/C) | (0.1% Pd/C) | (0.1% Pd/C) |
| Purified TPA: | | | | | | |
| CBA, p.p.m | <50 | <50 | 5 | 20 | 10 | 35 |
| TA, p.p.m | 55 | 75 | 215 | 75 | <50 | <100 |
| Co, p.p.m | | | | <10 | | |

| Example | XIV | XV | XVI [8] | XVII | XVIII | XIX |
|---|---|---|---|---|---|---|
| Crude TPA [1]: | | | | | | |
| Percent CBA [2] | 0.71 | 0.71 | 0.3 | 0.71 | 0.39 | 0.71 |
| Percent TA [3] | 0.82 | 0.82 | 0.58 | 0.82 | 0.38 | 0.82 |
| Co, p.p.m.[4] | | | | 860 | | 860 |
| Solvent: | | | | | | |
| Percent AcOH [5] | 95 | 95 | 95 | | | |
| Percent H$_2$O | 5 | 5 | 5 | 100 | 100 | 100 |
| Percent TPA concentration in solution | 20 | 20 | 20 | 20 | 20 | 20 |
| Catalyst, percent | 1 | 1 | 1 | 1 | 1 | |
| (Wt. percent of solution) | (0.1% Pd/C) | (0.1% Pd/C) | (0.5% Pd/C) | (0.1% Pd/C) | (0.5% Pd/C) | |
| Purified TPA: | | | | | | |
| CBA, p.p.m | 80 | 30 | 41 | 90 | 11 | 5,900 |
| TA, p.p.m | 330 | 62 | <200 | 3,800 | 6,300 | 2,200 |
| Co, p.p.m | | | | <10 | | <10 |

[1] TPA=terephthalic acid.
[2] CBA=4-carboxybenzaldehyde.
[3] TA=toluic acid.
[4] Co, p.p.m.=cobalt, parts per million.
[5] AcOH=acetic acid.
[6] Pd=palladium; C=charcoal pellets.
[7] Al=alumina.
[8] 0.2% N in crude TPA, 10 p.p.m. in purified TPA.

I claim:

1. In a process for purifying an impure aromatic dicarboxylic acid obtained by air or nitric acid oxidation which comprises catalytically hydrogenating said acid, dissolved in a solvent, at elevated temperature and recovering a purified aromatic dicarboxylic acid, the improvement which comprises employing, as said solvent, an aliphatic saturated fatty acid and from 0 to about 30% by volume, based on the total volume of said solvent, of water.

2. A process as described in claim 1 wherein said aromatic dicarboxylic acid is terephthalic acid.

3. A process as described in claim 2 wherein said terephthalic acid is obtained from air oxidation of p-xylene in the presence of a cobalt catalyst.

4. A process as described in claim 2 wherein said terephthalic acid is obtained from nitric acid oxidation of p-xylene.

5. A process as described in claim 2 wherein the catalyst employed in said catalytic hydrogenation comprises a carbon-supported noble metal.

6. A process as described in claim 5 wherein said catalyst comprises palladium on charcoal.

7. A process as described in claim 6 wherein said aliphatic saturated fatty acid is a lower aliphatic saturated fatty acid which is a liquid at room temperature.

8. A process as described in claim 7 wherein said lower aliphatic saturated fatty acid contains from 2 to 5 carbon atoms, inclusive.

9. A process as described in claim 8 wherein said lower aliphatic saturated fatty acid is acetic acid.

10. A process as described in claim 9 wherein said solvent contains from about 2% to about 20% by volume, based on the total volume of said solvent, of water.

11. In a process for purifying impure terephthalic acid obtained from air or nitric acid oxidation of p-xylene which comprises catalytically hydrogenating said acid, dissolved in a solvent, at a temperature above about 250° C. in the presence of a catalytic amount of palladium on charcoal, and recovering purified terephthalic acid, the improvement which comprises employing, as said solvent, a mixture of acetic acid and water in a ratio of from about 95%:5% to about 80%:20%, respectively, by volume, with the concentration of terephthalic acid dissolved in said solvent being from about 5% to about 30% by weight, based on the total weight of the solution.

12. A process as described in claim 11 wherein said terephthalic acid is obtained from air oxidation of p-xylene in the presence of a cobalt catalyst.

13. A process as described in claim 11 wherein said terephthalic acid is obtained from nitric acid oxidation of p-xylene.

14. A process as described in claim 11 wherein the concentration of terephthalic acid dissolved in said solvent is from about 10% to about 20% by weight, based on the total weight of the solution.

References Cited

UNITED STATES PATENTS

| 3,058,997 | 10/1962 | Taylor et al. | 260—525 |

FOREIGN PATENTS

| 908,639 | 10/1962 | Great Britain | 260—618 |
| 994,769 | 6/1965 | Great Britain | 260—525 |

JAMES A. PATTEN, Primary Examiner

R. S. WEISSBERG, Assistant Examiner